(12) United States Patent
Rashidi et al.

(10) Patent No.: US 12,462,306 B2
(45) Date of Patent: Nov. 4, 2025

(54) DATA STRUCTURES IN AN ORCHESTRATION ENGINE

(71) Applicant: THE BOSTON CONSULTING GROUP, INC., Boston, MA (US)

(72) Inventors: Vahid Rashidi, Boston, MA (US); Zijia Xu, Boston, MA (US); Javier Anta Callersten, Boston, MA (US); Roelant Lennert Claudius Kalthof, Boston, MA (US); Sebastian Bak Adamek, Boston, MA (US); Connie Gao, Boston, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 78 days.

(21) Appl. No.: 18/521,201

(22) Filed: Nov. 28, 2023

(65) Prior Publication Data

US 2025/0173791 A1 May 29, 2025

(51) Int. Cl.
*G06Q 40/06* (2012.01)
*G06Q 30/0283* (2023.01)

(52) U.S. Cl.
CPC ......... *G06Q 40/06* (2013.01); *G06Q 30/0283* (2013.01)

(58) Field of Classification Search
CPC ............................ G06Q 40/06; G06Q 30/0283
USPC ...................................................... 705/35–45
See application file for complete search history.

(56) References Cited

U.S. PATENT DOCUMENTS

| | | | | |
|---|---|---|---|---|
| 5,978,778 | A | * 11/1999 | O'Shaughnessy | G06Q 40/04 705/37 |
| 2005/0108148 | A1 | * 5/2005 | Carlson | G06Q 40/04 705/37 |
| 2010/0211455 | A1 | 8/2010 | Williams et al. | |
| 2011/0161162 | A1 | 6/2011 | Ketchum | |
| 2011/0178953 | A1 | * 7/2011 | Johannes | G06Q 40/06 705/36 R |
| 2011/0264476 | A1 | * 10/2011 | Work | G06Q 40/06 705/7.11 |
| 2015/0310481 | A1 | 10/2015 | Brown et al. | |
| 2020/0034859 | A1 | 1/2020 | Sengupta et al. | |
| 2020/0302473 | A1 | 9/2020 | Genc-Kaya et al. | |

(Continued)

OTHER PUBLICATIONS

International Search report and Written Opinion in International Appln. No. PCT/US2024/057284, mailed on Mar. 12, 2025, 9 pages.

*Primary Examiner* — Robert R Niquette
(74) *Attorney, Agent, or Firm* — Fish & Richardson P.C.

(57) ABSTRACT

A computer system comprising of an orchestration engine that allows for optimizing of investment allocation across plural levers, the orchestration engine configured to: receive input data that includes historic data regarding pricing and sales according to plural levers; prepare the received input data by converting the plural levers in the received input data into a common currency; calculate historical return on investment based on the common currency; simulate return on investment using the calculated historical return on investment and a machine learning model of a given campaign based on historical sales, campaign definitions, and investment metrics; optimize the simulated return on investment from the campaign with respect to one or more optimization goals and constraints; and output from the optimizer an optimized, campaign plan.

20 Claims, 9 Drawing Sheets

(56) References Cited

U.S. PATENT DOCUMENTS

2022/0318911 A1\* 10/2022 Heitkotter .............. G06Q 40/04
2024/0127337 A1\* 4/2024 Zheltikov .............. G06Q 40/06

\* cited by examiner

DATA STRUCTURES IN AN ORCHESTRATION ENGINE

TECHNICAL FIELD

This disclosure relates to systems and methods for implementing data structures in an orchestration engine.

BACKGROUND

This invention relates to optimization of retail sales and profit.

A SKU is short for "stock keeping unit." A SKU is a number that retailers internally assign to products to keep track of stock levels. If a product has different colors and sizes, each variation of the product will generally have a unique SKU number.

Retailers make multiple investments to gain and retain consumers. For example, a retailer might have a price reduction or a mass promotion or have personalized offers or offer loyalty benefits or place products into markdowns, etc. across many, e.g., SKU's. However, these investments are typically fragmented, siloed between departments, and not consistently tracked. This lack of visibility and shared knowledge results in stacked value investments such as stacked promotions, stacked promo and Mark downs etc. for the same products and at the same time, a sub-optimal allocation of investment resources. These stacked promotions may present a confusing pricing/promotion proposition for the consumer, with a final result of a reduced return on value investments (ROI).

Traditional (brick and mortar) retailers face numerous challenges today. For example, discounters and technology companies continue to gain market share from traditional (brick and mortar) retailers. Price/cost inflations places pressure on profit margins, while increasingly competitor sophistication in use of digital marketing and personalization techniques continues to increase.

SUMMARY

This increased sophistication in competition makes it more important to orchestrate the value investments so as to invest where it matters to the customer to beat the competition.

Retailers invest in multiple ways across value levers such as price, promotions, personalization and digital marketing to attract and retain consumers. However spending decisions are usually not optimized across levers or within levers. These spending decisions are fragmented, resulting in missed scale benefits, and not consistently tracked which impacts an assessment of ROI based on category and/or SKU levels, and are siloed between departments preventing sharing of best practices.

Key investment questions retailers should ask include what is the best ROI for a price investment, i.e., an everyday price or a promotion, a mass promotion or a personalized promotion? Another key investment question retailers should ask is what is the best investment strategy to use for different categories, e.g., high/low pricing, medium/low pricing or an everyday low price (EDLP)? EDLP is a pricing strategy in which firms promise consumers consistently low prices on products without having to wait for sales events. In such a pricing strategy, a firm sets a low price and maintains it over a long time-horizon (given that product costs remain unchanged).

According to an aspect, a computer system comprises of an orchestration engine that allows for optimizing of investment allocation across plural levers, the orchestration engine configured to: receive input data that includes historic data regarding pricing and sales according to plural levers; prepare the received input data by converting the plural levers in the received input data into a common currency; calculate historical return on investment based on the common currency; simulate return on investment using the calculated historical return on investment and a machine learning model of a given campaign based on historical sales, campaign definitions, and investment metrics; optimize the simulated return on investment from the campaign with respect to one or more optimization goals and constraints; and output from the optimizer an optimized, campaign plan.

In an aspect 2 according to aspect 1, wherein the computer system is further configured to: optimize the investment allocation across the plural that include at least one selected from the group including pricing, mass promotion, personalized offers, loyalty, and markdowns levers.

In an aspect 3 according to any one of aspects 1 to 2, wherein the common currency provides a standardized metric for measuring true effects in a comparable way between pricing mass promotion, personalized offers, loyalty, and markdowns levers.

In an aspect 4 according to any one of aspects 1 to 3, wherein the machine learning model takes into account plural components that impact an actual return on investment for an actual campaign.

In an aspect 5 according to any one of aspects 1 to 4, wherein a true return on investment is calculated for each actual campaign and each lever.

In an aspect 6 according to any one of aspects 1 to 5, wherein the orchestration engine is further configured to: convert the plural levers in the received input data into the common currency according to a like-for-like incremental sales/margin values that are calculated for different ones of the plural levers.

In an aspect 7 according to any one of aspects 1 to 6, wherein the orchestration engine is further configured to: determine for each lever of the plural levers used by the retailer the like-for-like incremental sales/margin values.

In an aspect 8 according to any one of aspects 1 to 7, wherein for the orchestration engine is further configured to: calculate an incremental sales or an incremental margin value for each lever of the plural levers.

In an aspect 9 according to any one of aspects 1 to 8, wherein the orchestration engine is further configured to: compare the calculated incremental sales or the incremental margin value for each lever of the plural levers to determine which lever of the plural levers has a highest incremental sales and/or incremental margin value.

According to an aspect 10, one or more machine-readable hardware storage devices for orchestration engine that allows for optimizing of investment allocation across plural levers, the one-more machine-readable hardware storage devices storing instructions that are executable by one or more processors to cause the orchestration engine: receive input data that includes historic data regarding pricing and sales according to plural levers; prepare the received input data by converting the plural levers in the received input data into a common currency; calculate historical return on investment based on the common currency; simulate return on investment using the calculated historical return on investment and a machine learning model of a given campaign based on historical sales, campaign definitions, and investment metrics; optimize the simulated return on investment from the campaign with respect to one or more optimization goals and constraints; and output from the optimizer an optimized, campaign plan.

In an aspect 11 according to aspect 10, wherein the orchestration engine is further configured to: optimize the investment allocation across the plural that include at least one selected from the group including pricing, mass promotion, personalized offers, loyalty, and markdowns levers.

In an aspect 12 according to any one of aspects 10 to 11, wherein the common currency provides a standardized metric for measuring true effects in a comparable way between pricing mass promotion, personalized offers, loyalty, and markdowns levers.

In an aspect 13 according to any one of aspects 10 to 12, wherein the machine learning model takes into account plural components that impact an actual return on investment for an actual campaign.

In an aspect 14 according to any one of aspects 10 to 13, wherein a true return on investment is calculated for each actual campaign and each lever.

In an aspect 15 according to any one of aspects 10 to 14, wherein the orchestration engine is further configured to: convert the plural levers in the received input data into the common currency according to a like-for-like incremental sales/margin values that are calculated for different ones of the plural levers.

In an aspect 16 according to any one of aspects 10 to 15, wherein the orchestration engine is further configured to: determine for each lever of the plural levers used by the retailer the like-for-like incremental sales/margin values.

In an aspect 17 according to any one of aspects 10 to 16, wherein for the orchestration engine is further configured to: calculate an incremental sales or an incremental margin value for each lever of the plural levers.

In an aspect 18 according to any one of aspects 10 to 17, wherein the orchestration engine is further configured to: compare the calculated incremental sales or the incremental margin value for each lever of the plural levers to determine which lever of the plural levers has a highest incremental sales and/or incremental margin value.

According to an aspect 19, a method implemented by an orchestration engine of a data processing system that allows for optimizing of investment allocation across plural levers, the method including receiving input data that includes historic data regarding pricing and sales according to plural levers; preparing the received input data by converting the plural levers in the received input data into a common currency; calculating historical return on investment based on the common currency; simulating return on investment using the calculated historical return on investment and a machine learning model of a given campaign based on historical sales, campaign definitions, and investment metrics; optimizing the simulated return on investment from the campaign with respect to one or more optimization goals and constraints; and outputting from the optimizer an optimized, campaign plan.

In an aspect 20 according to aspect 19, wherein the method includes optimizing the investment allocation across the plural that include at least one selected from the group including pricing, mass promotion, personalized offers, loyalty, and markdowns levers.

In an aspect 21 according to any one of aspects 19 to 20, wherein the common currency provides a standardized metric for measuring true effects in a comparable way between pricing mass promotion, personalized offers, loyalty, and markdowns levers.

In an aspect 22 according to any one of aspects 19 to 21, wherein the machine learning model takes into account plural components that impact an actual return on investment for an actual campaign.

In an aspect 23 according to any one of aspects 19 to 22, wherein a true return on investment is calculated for each actual campaign and each lever.

In an aspect 24 according to any one of aspects 19 to 23, including converting the plural levers in the received input data into the common currency according to a like-for-like incremental sales/margin values that are calculated for different ones of the plural levers.

In an aspect 25 according to any one of aspects 19 to 24, including determining for each lever of the plural levers used by the retailer the like-for-like incremental sales/margin values.

In an aspect 26 according to any one of aspects 19 to 25, including calculating an incremental sales or an incremental margin value for each lever of the plural levers.

In an aspect 27 according to any one of aspects 19 to 26, including comparing the calculated incremental sales or the incremental margin value for each lever of the plural levers to determine which lever of the plural levers has a highest incremental sales and/or incremental margin value.

The described orchestration engine helps retailers improve their net ROI of budget spending decisions by eliminating ineffective stacking of activities and establishing a common currency across all investments. Common currency is a metaphor for common ways of comparing the value uplift from different levers (pricing, promo, etc.). Common currency as used herein has no connection with Fiat currencies that countries use. For example, common currency is meant that value uplift (e.g. sales or gross profit) from a same amount of investment in different levers is comparable on a similar basis, such as price, promotions, mark downs, etc., which are different ways to price an item and provide value to a consumer. That is, would a retailer be better off selling the product at $4/unit or set the price at $5/unit and then give a $1/unit discount, which effectively gives the consumer the product at the same price. Given a set of input data such as historical sales and detailed campaign activity for each of a plurality of investment levers to be tracked, the model provides an estimate of true ROI for each lever, and provides inputs for a simulation to propose an optimized investment plan that maximizes ROI for a given available budget amount.

The described Orchestration Engine uses artificial intelligence to provide a step-change solution to produce the common currency for comparing different retailer investments. An example of a type of comparison includes price vs promotion and mass promotion vs personalized promotion. The described Orchestration Engine analyzes, compares and optimizes a given campaign across various price/promotional strategies to maximize business objectives and determine an optimal way to rebalance investment such that business objectives are maximized on every SKU. Benefit of orchestration include not just stacking, but common currency, interlinkage between tools, business intelligence to optimize trade-offs, etc.

The described Orchestration Engine therefore may help avoid fragmented value investments, as such investments are no longer, siloed between departments, and are now consistently tracked. This visibility and shared knowledge results in avoiding stacked promotions for same products at the same time, and provides a more optimal allocation of investment resources. These stacked promotions may present a confusing pricing/promotion proposition for the consumer, with a final result of a reduced return on investment (ROI).

The details of one or more embodiments of the invention are set forth in the accompanying drawings and the description below. Other features, objects, and advantages of the invention will be apparent from the description and drawings, and from the claims.

DETAILED DESCRIPTION

Described below is a unique, common currency that is used across a retailer's investments. Value investments are defined as investments in base price, mass promotions, personalized promotions and other marketing campaigns. Advantages in using the unique common currency allows direct comparison across pricing, mass promotion, personalized offers, loyalty, and markdowns levers and other marketing types of levers. This enables optimal investment allocation across verticals instead of the conventional topline approach. One type of optimization is SKU level optimization that allows a differentiated investment allocation between SKUs, e.g., one product may have more invested in personalized promotion vs another product, e.g., in pricing, even when both products are in a same category of products, but their pricing strategy is different. In addition, analysis and optimization occur across verticals in a single view. Functions are no longer siloed, within the merchandising and retail organization, and investment/strategy is holistic and more consistent for consumers. That is if the retailer invests in the proper levers, the retailer's investments may drive positive consumer value perception, which results in growth for the retailer.

Figure 1:
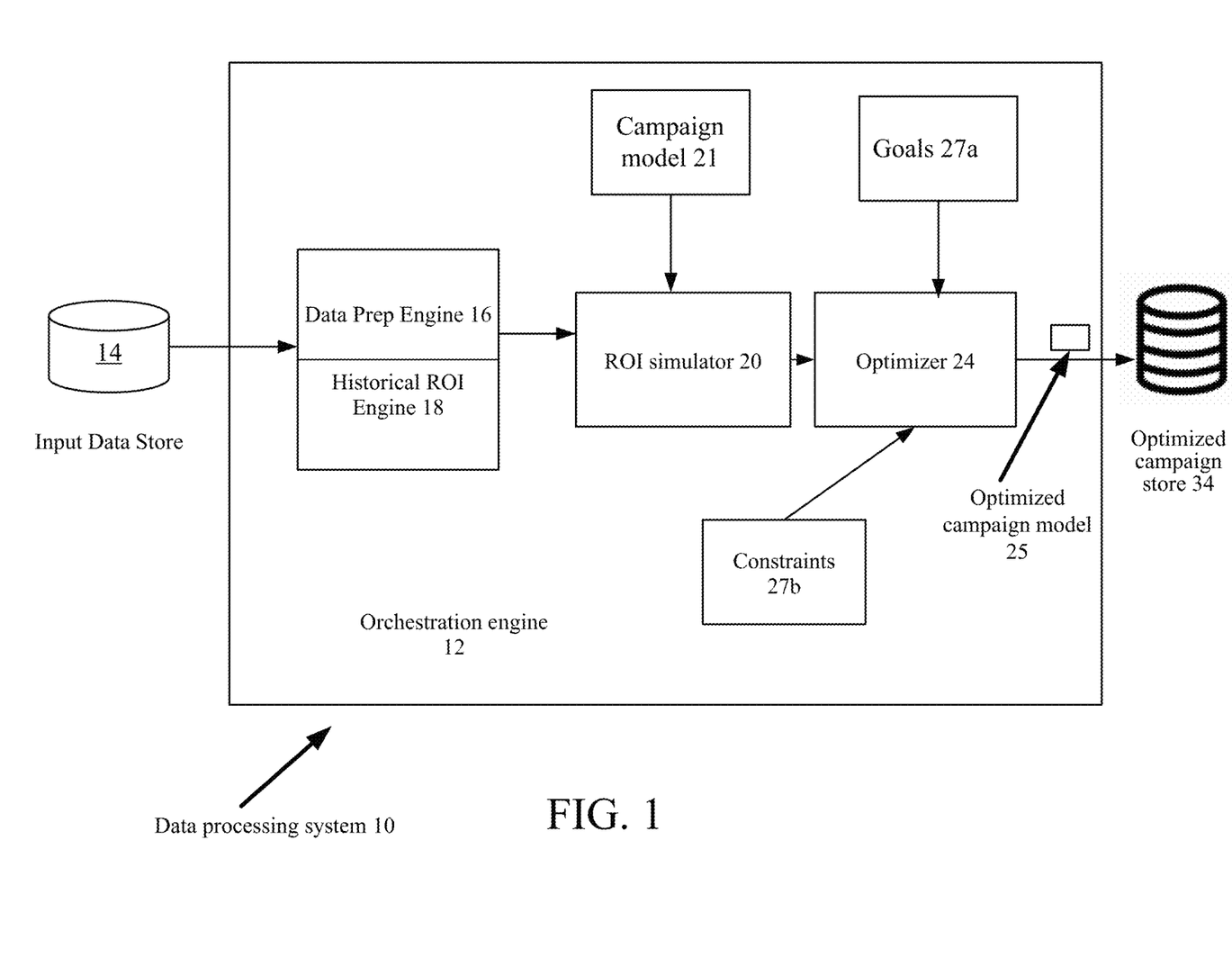
FIG. 1 is a block diagram of a data processing system including an orchestration engine.

Referring now to FIG. 1, a data processing system 10 is shown. The data processing system 10 includes an orchestration engine 12 that includes an input data store 14. The input data store is a non-transitory hardware storage device that is either persistent, i.e., data remains when power is removed, or non-persistent, i.e., data is lost when power is removed. The orchestration engine 12 also includes a data preparation engine 16. The data preparation engine 16 receives input data from the input data store 14. The input data store 14 is a non-transitory, hardware storage system that stores the input data as data structures 15. The data structures from the input data store 14 includes fields that have calculated data for modeled common currency values. The orchestration engine 12 determines common currency values and assigns the common currency values to corresponding fields in the data structures 15.

The orchestration engine 12 also includes an historical ROI engine 18. The historical ROI engine 18 receives the converted data structures 15' from the data preparation engine 16 and produces from the converted data structures 15' from the data preparation engine 16 an historical ROI. The orchestration engine 12 also includes a simulated ROI engine 20. The simulated ROI engine 20 receives a campaign model 21 and produces a simulated ROI. The simulated ROI is fed to an optimizer engine 24 that optimizes the simulated ROI according to received optimization goals 27a and constraints 27b, e.g., an available budget. The optimizer engine 24 to define details produces from the simulated ROI, the received optimization goals 27a and the received constraints 27b, an optimized campaign model 25 that is stored in optimized campaign store 34, another non-transitory, hardware storage system.

Figure 2:
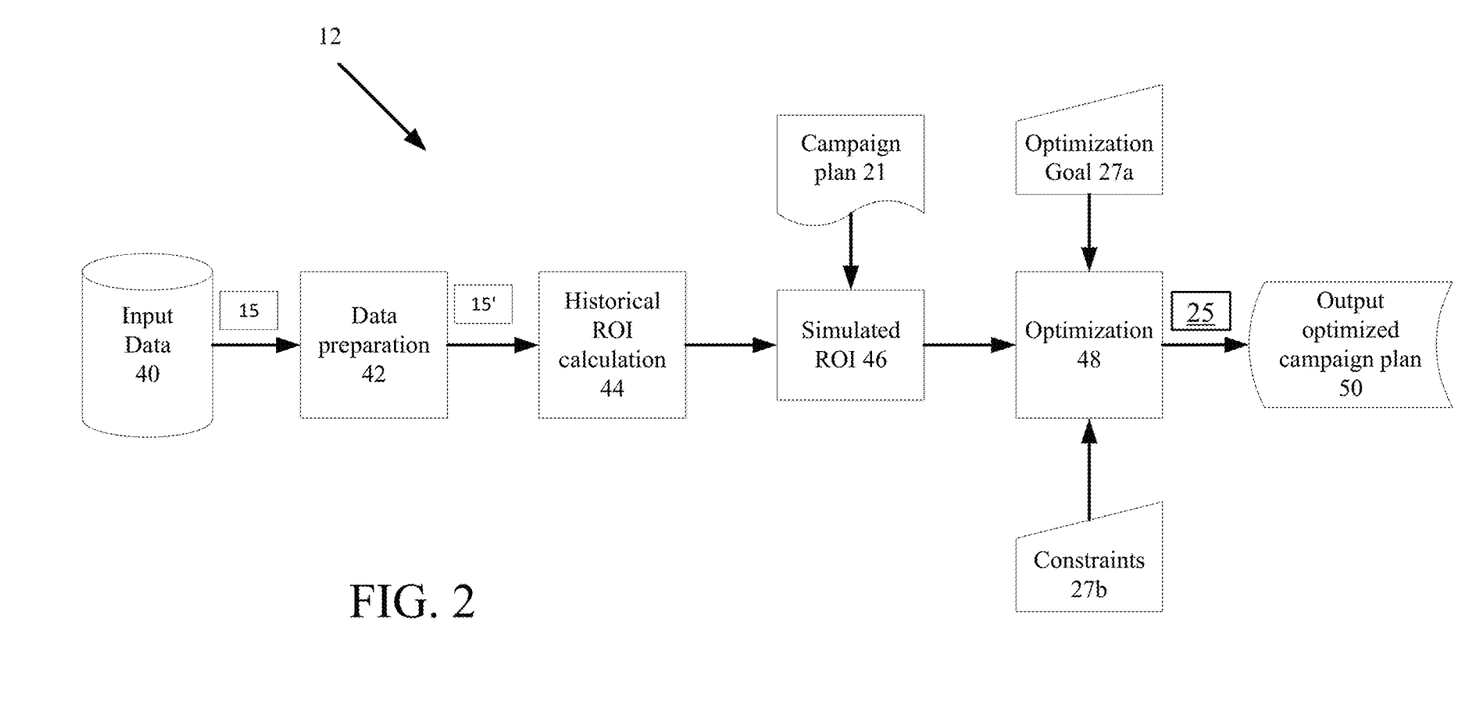
FIG. 2 is a diagram of the orchestration engine.

Referring now to FIG. 2, the orchestration engine 12 allows for optimizing of investment allocation across many levers such as across pricing, mass promotion, personalized offers, loyalty, and markdowns levers and other marketing types of levers. The orchestration engine 12 receives 40 the input data from various non-transitory, hardware storage system sources in the form of data structures. The input data is received from various sources and includes historic data regarding pricing, e.g., per SKU, sales, e.g., per SKU, etc. The pricing information is in various native currencies. The orchestration engine 12 prepares 42 the received input data by converting native currency values in the received input data structures into a standardized data, that is, a unique common currency.

However, not all prices or promotions work equally well for both the retailers and the consumers. For example, assume that a retailer desires to sell a bag of chips. The retailer can price the chips a $10 per bag or the retailer can price the chips at $11/bag and then give a $1 promotion to reduce the net price to $10. While the final price the consumer pays in both situations is the same, some customer value perception may be different and the profit the retailer receives may be different depending on which strategy the retailer uses. The strategy impacts the consumers' perception of the retailer and may change the consumer's behavior. The strategy may also impact the consumers' appreciation of the retailer and may change the consumer's behavior toward the retailer. For sake of this example the retailer sets the final price at $10. But almost always the situation is not as straightforward. For example, the retailer may decide between different mechanisms—e.g., a blanket offer (i.e., $10/bag) or an active coupon clipping offer ($12/bag plus a $2 promotion for consumers who participate in the promotion by clipping the promotion).

The retailer would want to know what the profit gain is if the retailer uses either the above options for pricing the bag of chips. This is a simple example and often consumers have to make decisions between many levers: promotion, price, mark down, loyalty, personalization, etc. The challenging part is that they need to measure the true impact of each one of these levers in a way that makes them comparable. Usually, the measurement methods for incremental sales/margin are different or they are calculated considering different components etc.—this makes it hard to know whether a $10/bag price is better or $11/bag with the $1 promotion is better. Generally, incremental sales is an indicator that specifies the financial value of various activities, e.g., by calculating a business's revenue from its activities above what they normally sell. Therefore, common currency is used to decide whether a $10/bag price is better or a $11/bag and $1 promotion on top.

Another example is the trade-off between long-term impact and short-term impact of levers. For example, a mass promotion is rather short-lived while pricing impact is usually more long-term. If a retailer is known for "Every Day Low Prices,"

(EDLP) consumers tend to purchase from that retailer more, reliably knowing this is the best price they get and consumers are more likely to go back-though it takes time to build that perception. A retailer that gives mass promotions will have high sales during promotion, but when the promotions ends, they tend to have a higher sales price so sales will likely drop-hence the impact is short-lived.

The concept of common currency is determined for each lever used by the retailer on a like-for-like incremental sales/margin values that are calculated for each of the levers. That is, given a lever the orchestration engine calculates an incremental sales or an incremental margin value for the lever. These values are common currency values that are compared per lever to determine which lever will generate the highest incremental sales and/or incremental margin impact.

The orchestration engine 12 calculates 44 the historical ROI based on the common currency that was determined from the prepared input data. The common currency provides standardized metrics for measuring true effects, such as a true return on investment, in a comparable way between pricing mass, targeted and fully personalized offers.

Figure 4:
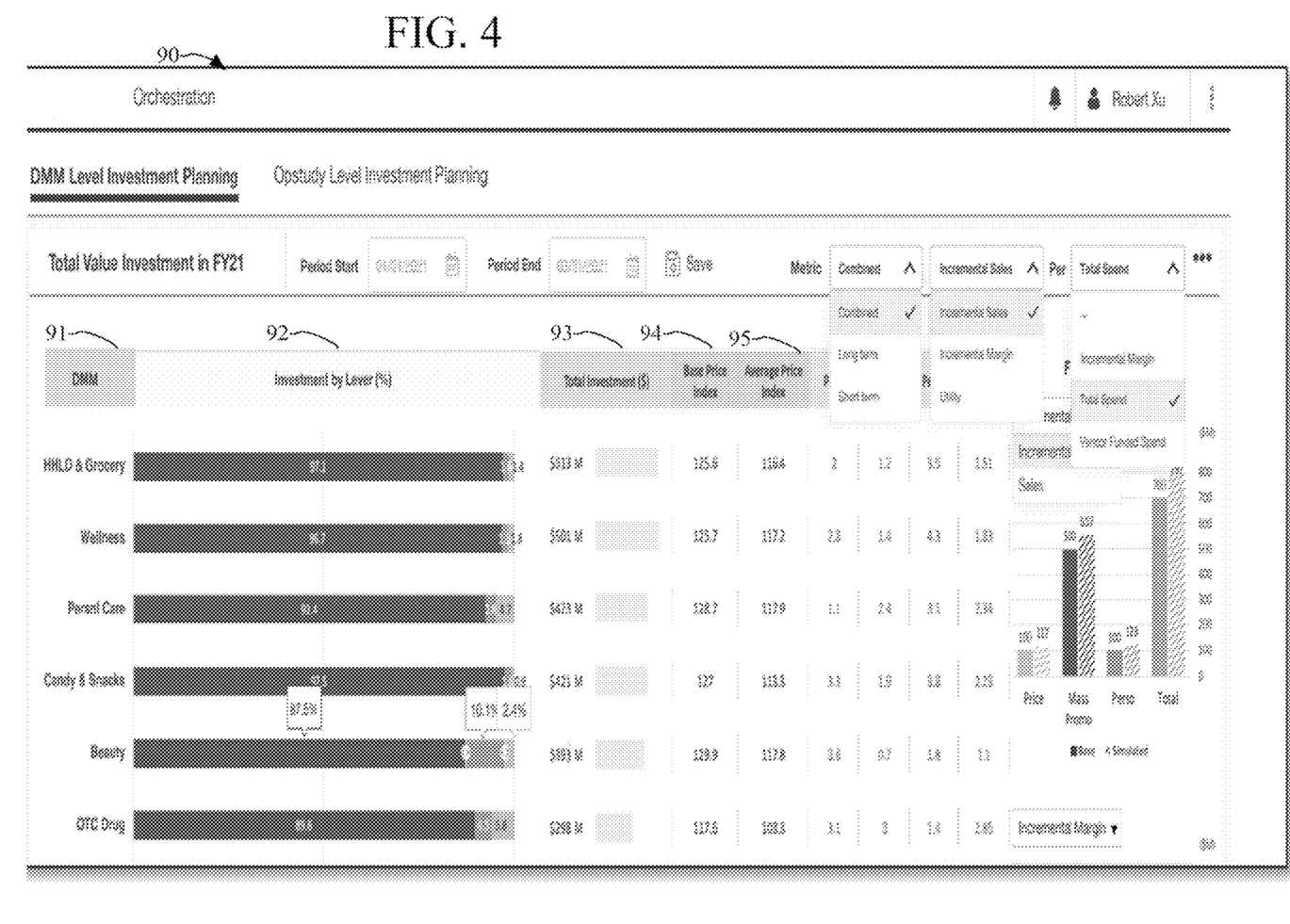
FIGS. 4-7 are diagrams depicting graphical user interfaces.

The orchestration engine 12 uses the calculated ROI and a campaign model 21 to provide a simulated ROI 46. This is accomplished by the orchestration engine 12 using machine learning models (ML) that provide the simulated ROI of any given campaign based on historical sales, campaign definitions, and investment metrics (See. FIG. 4) associated with the given campaign. Campaign definitions are details of the given campaign. Different algorithms may be used. One example algorithm that is used when demand forecasting engines are built is "like-for-like price elasticities" to calculate the uplifts and do comparisons on where there is an inflection point in investment return given an elasticity curve. Elasticity is a measure of a percentage change of one economic variable in response to a percentage change in another economic variable. Elasticity such as in demand curves are not linear and values differ at different prices for each lever. These models take into account plural components that impact an actual return on investment (actual ROI) for actual campaigns in the short term such as uplift, cannibalization effect, halo effect, and pull-forward effect, but also include mid-term impacts, such changes in/to Customer Lifetime Value (CLV). CLV is a change in consumers' behavior over the long-term and how the consumers shopping patterns change. The system uses sales information to identify pattern changes in consumer sales behavior and quantify that value. An alternative and/or complementary method is to track consumer perception of value over time by using periodic surveys where the consumers are asked how they feel about the value they received from the retailer. Changes in the periodic surveys inform the orchestration engine of perception changes compared to the prior surveys taken over the prior 6 months or prior year, etc. Changes in the periodic surveys inform the orchestration engine of perception changes compared to other retailers.

The simulated ROI is used as an input to an optimizer 48 that also receives one or more optimization goals 27a and constraints 27b. The output of the optimizer 48 is an output optimized, campaign plan 50.

True ROI is calculated by the orchestration engine 12 for each campaign and investment lever. Also modelling of diminishing returns are calculated by the orchestration engine 12 when several campaigns collide in time. The orchestration engine 12 provides a prediction(s) of an expected return of any given investment calendar, e.g., time period of a campaign, and determines optimal investment distribution among levers to maximize ROI for a given period, provided that there exists available budget and other constraints that are met. Other constraints include for example how much vendor funding is the retailer expect to receive from the supplier of the goods. An offer may look great to the retailer with a current vendor funding level. However, if vendor does not fund the offer beyond the current investment level, then the offer may no longer be viewed by the retailer as a good offer. Another constraint is minimum advertised pricing, e.g., the retailer cannot by contract reduce the price beyond a certain point because of the minimum advertised pricing (MAP) agreement with the vendor. The orchestration engine 12 has these constraints built into a client device 170 (see FIG. 8), so the constraints can differ from retailer to retailer and there is an element of customization that can be made by the retailer. The orchestration engine 12 can be tested across pricing, mass promotion, personalized offers, loyalty, and markdowns levers and other marketing types of levers.

The orchestration engine 12 uses the common currency for allocating investments across various alternatives, and measure impact along a full value chain (e.g., item, category and store.) The orchestration engine 12 provides a tool to guide marketing team(s), buyer(s), and category team(s). The orchestration engine 12 increases sophistication of reporting to be added over time. The orchestration engine 12 uses a common data set for all reports and provides information that is presented in a simple and actionable manner that is tailored to the needs of each user (i.e., marketing team(s), buyer(s), etc.).

The orchestration engine 12 is a decision support engine that uses historic data and historic evidence, i.e., actual ROI values obtained from historical forecasts, such as literal sales and margin lift numbers, to forecast future allocations of investments across the various alternatives of across pricing, mass promotion, personalized offers, loyalty, and markdowns levers and other marketing types of levers. The orchestration engine 12 uses AI algorithms to give a best estimate on the performance of untested combinations. The AI algorithms include elasticity curves from demand engines or running "what if scenarios." The orchestration engine 12 provides suggested recommendations on price and promotions, and marketing (e.g., for a SKU). The orchestration engine 12 uses the ROIs of different investments to define how much investment in each lever will generate a given amount of uplift and the client use the generated amount of uplift to define the right mix of investments. The orchestration engine 12 use the common currency to compare different retailer investments.

Sales Effectiveness (a Type of ROI)

Sales Effectiveness is defined as incremental sales divided by incremental investment (or alternatively discount). Sales effectiveness measures how efficient retailer investments are at driving increases in sales. Sales effectiveness allows comparisons across promotions and marketing investments. Sales effectiveness rank different types of investments. Sales Effectiveness reflects true sales and cost of activity. True sales are defined as a net of giveaway and profit invested, as net of any income made. Sales effectiveness allows the platform to make robust comparisons across different investment levers. Relative value is what counts.

The orchestration engine 12 provides visibility across pricing, mass promotion, personalized offers, loyalty, and markdowns levers and other marketing types of marketing and value levers. The orchestration engine 12 allows a user to view investments at a category level to provide insight into more or most effective value levers.

The orchestration engine 12 leverages the common currency to understand effectiveness of each lever by category. See discussion above regarding elasticities. The orchestration engine 12 allows the user to toggle the allocation of investment across levers to simulate potential value gain. The orchestration engine 12 sets investment targets and consistently tracks the investment targets by category over time. The orchestration engine 12 allows the user to toggle to view different time frames and actuals vs. plan. The orchestration engine 12 sets targets for investment levels for each category cross all levers (e.g., price, mass promotion).

The orchestration engine 12 leverages connected data sets, such as transaction, inventory, promotions, etc., to ensure investment calendar transparency. Calendar transparency occurs by the orchestration engine 12 causing a display to render a calendar that shows each item and the investments for each week on that item, e.g., according to the type of lever that the retailer is running, e.g., a promotional or a mark down etc. The orchestration engine 12 provides a full view of types of investments planned for each item's lifecycle (see FIG. 7).

Figure 3:
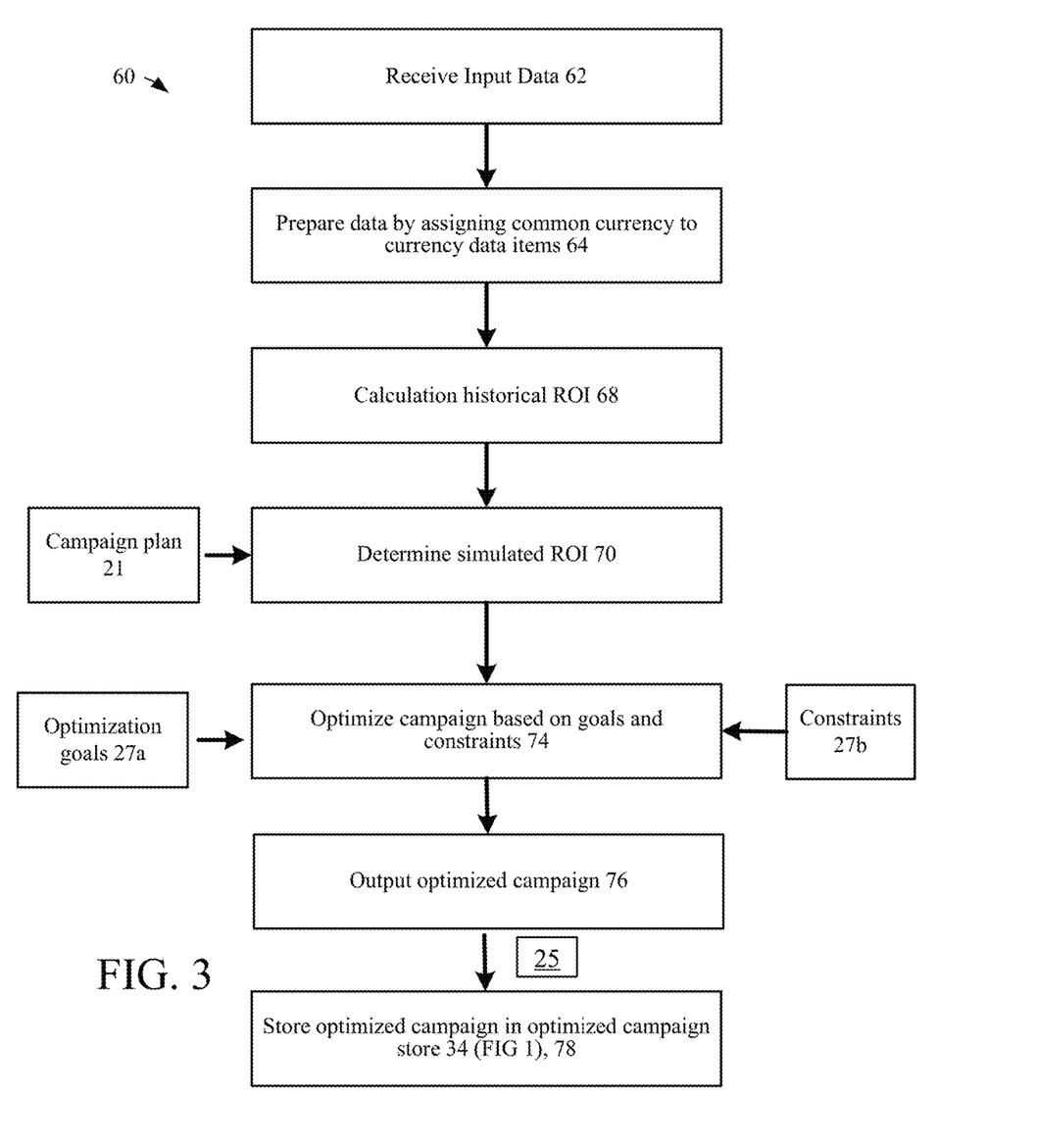
FIG. 3 is a flow diagram of the orchestration engine.

Referring now to FIG. 3, a method of executing an orchestration process 60 is shown. The orchestration process 60 is performed on the data processing system 10 FIG. 1). The orchestration process 60 receives 62 input data e.g., historical sales and historical evidence data, and prepares 64 the received input data to convert fields for currency values into the common currency value.

The orchestration process 60 also includes calculating of an historical ROI 68. The orchestration process 60 receives the unique common currency values and produces from the unique common currency values the historical ROI. The orchestration process 60 also provides a simulated ROI 70. The simulated ROI 70 receives a campaign plan 71 and produces from the campaign plan 71 the simulated ROI 70. The simulated ROI 70 is optimized 74 according to the received optimization goals 27a and constraints 27b (FIG. 1). The orchestration process 60 produces 76 from the simulated ROI 70, the received optimization goals 27a and the received constraints 27b, an optimized campaign that is stored 78 in optimized campaign store 34 (FIG. 1).

Referring now to FIG. 4, a graphical user interface (GUI) 90 is shown. GUI 90 allows a user to review value investments at a product category level. The GUI 90 shows various departments 91 and their corresponding investments by lever (%) 92, total investments in the common currency represented as dollars ($) 93, a base price index 94, average price index 95, as well as price, mass promotion, personal and total categories (hidden in FIG. 4, but see FIG. 5) to leverage common currency to understand effectiveness of each lever by category. GUI 90 shows three metrics as hiding the levers. GUI 90 shows the first metric as having three choices combined, long term and short term. GUI 90 shows the second metric as having three choices-incremental sales, incremental margin and utility. GUI 90 shows the third metric as having three choices incremental margin, total spend, and vendor funded support.

Figure 5:
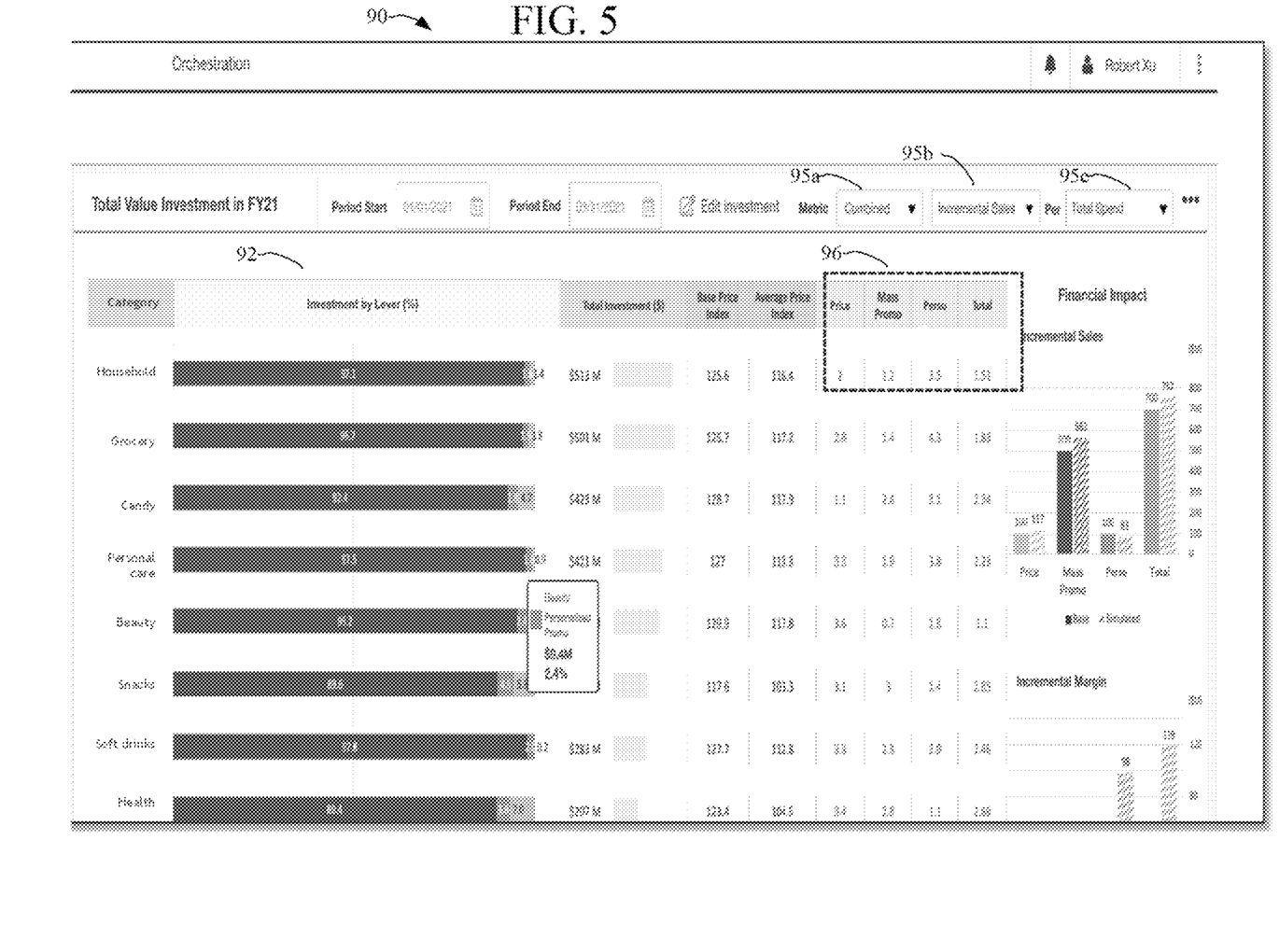

Referring now to FIG. 5, the graphical user interface (GUI) 90 (FIG. 4) is shown with the three metrics combined 95a, incremental sales, 95b and total spend 95c selected. The GUI 90 now shows the levers 96 price, mass promotions, personalized promotions and total exposed based on the user selecting the combined, incremental sales and total spend metrics of FIG. 4.

Figure 6:
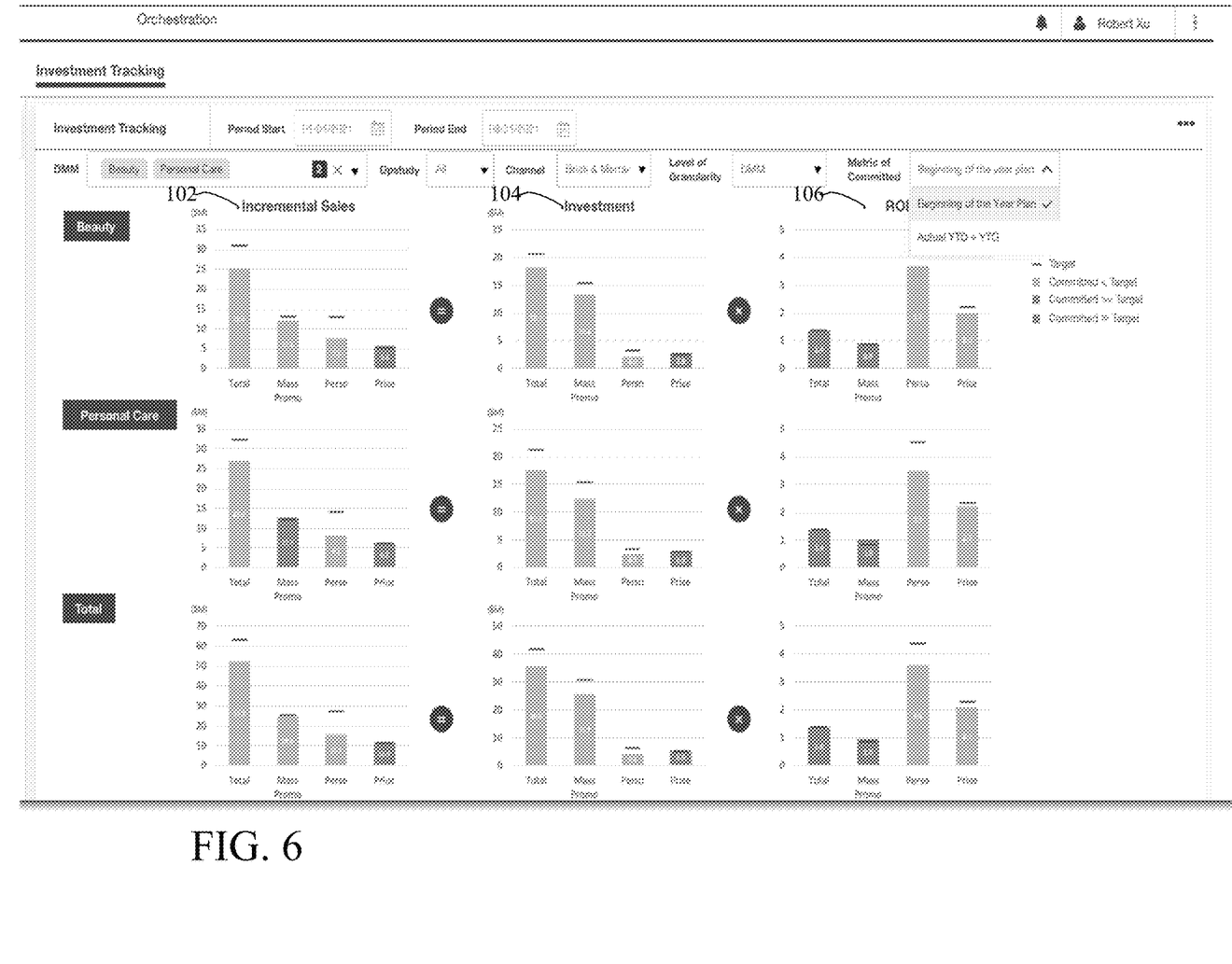

Referring now to FIG. 6, an investment tracking GUI 100 is shown with three categories, beauty, personal care and total shown. The investment tracking GUI 100 shows the incremental sales for each promotion 102, e.g., mass promotion, personalized promotion and price, as well as total. The investment tracking GUI 100 also shows the investment 104 for each of those promotions and also shows the ROI 106 for each of those promotions. The investment tracking GUI 100 allows the user to toggle to view different time frames and actuals vs. plan ROI on investments.

Figure 7:
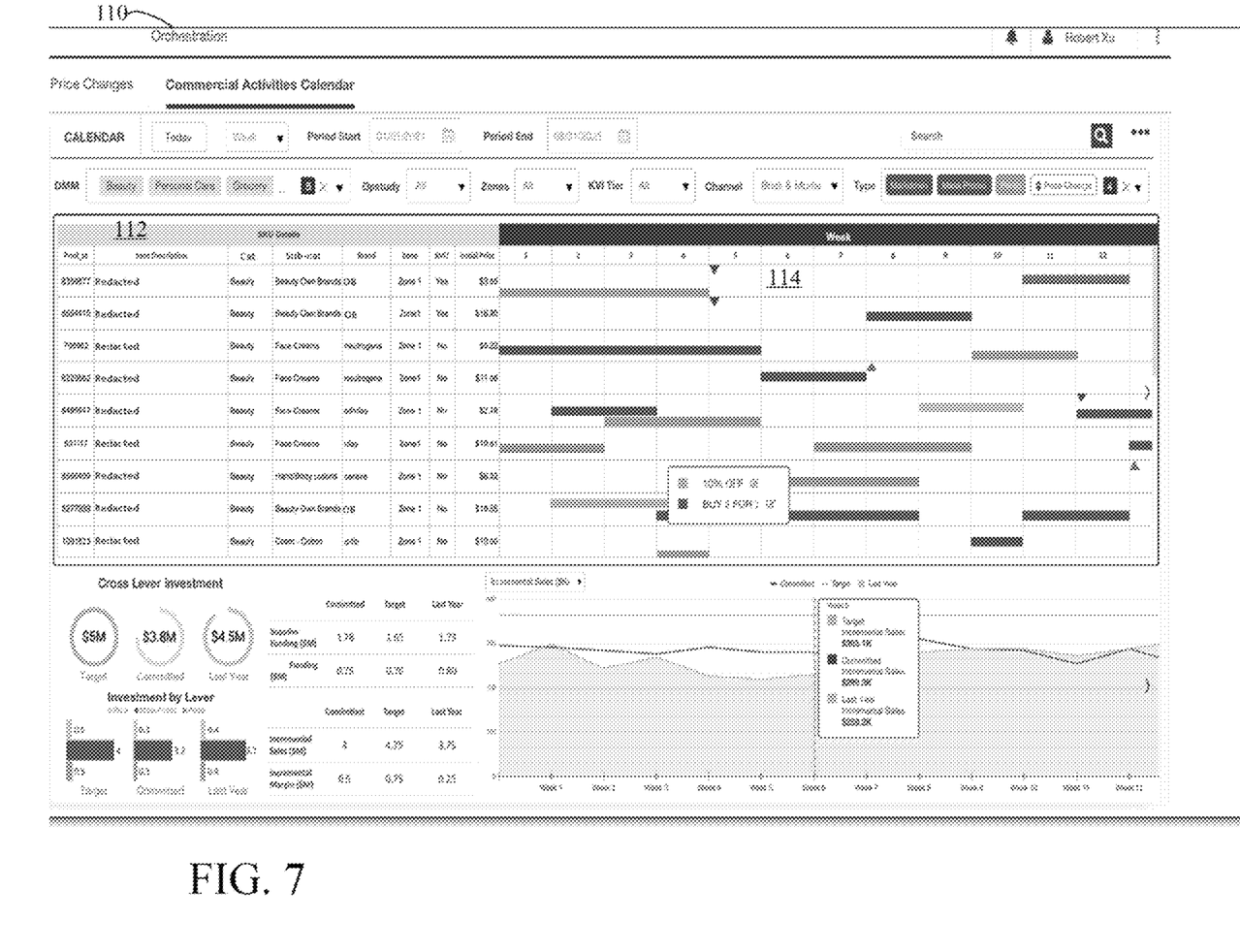

Referring now to FIG. 7, shows price changes in a commercial activities calendar GUI 110. The commercial activities calendar GUI 110 illustrates, e.g., for each SKU, SKU details 112, e.g., SKU number, item description, product category, brand, zone, and KVI. Zone is price zone, meaning that in some areas the price of the items are different, so each group of stores with a common price is a zone. KVI is key value item or key known item. These are items where consumers know their prices and so you want to be competitive on these prices, and initial price. Brand is simply the brand of the item, such as trademark, etc. The commercial activities calendar GUI 110 also provides a full view of types of investments planned for each SKU's lifecycle 114, measured in weeks, although other measurements can be used, depending on the product, etc.

Example Distributed Computing System Environment

Figure 8:
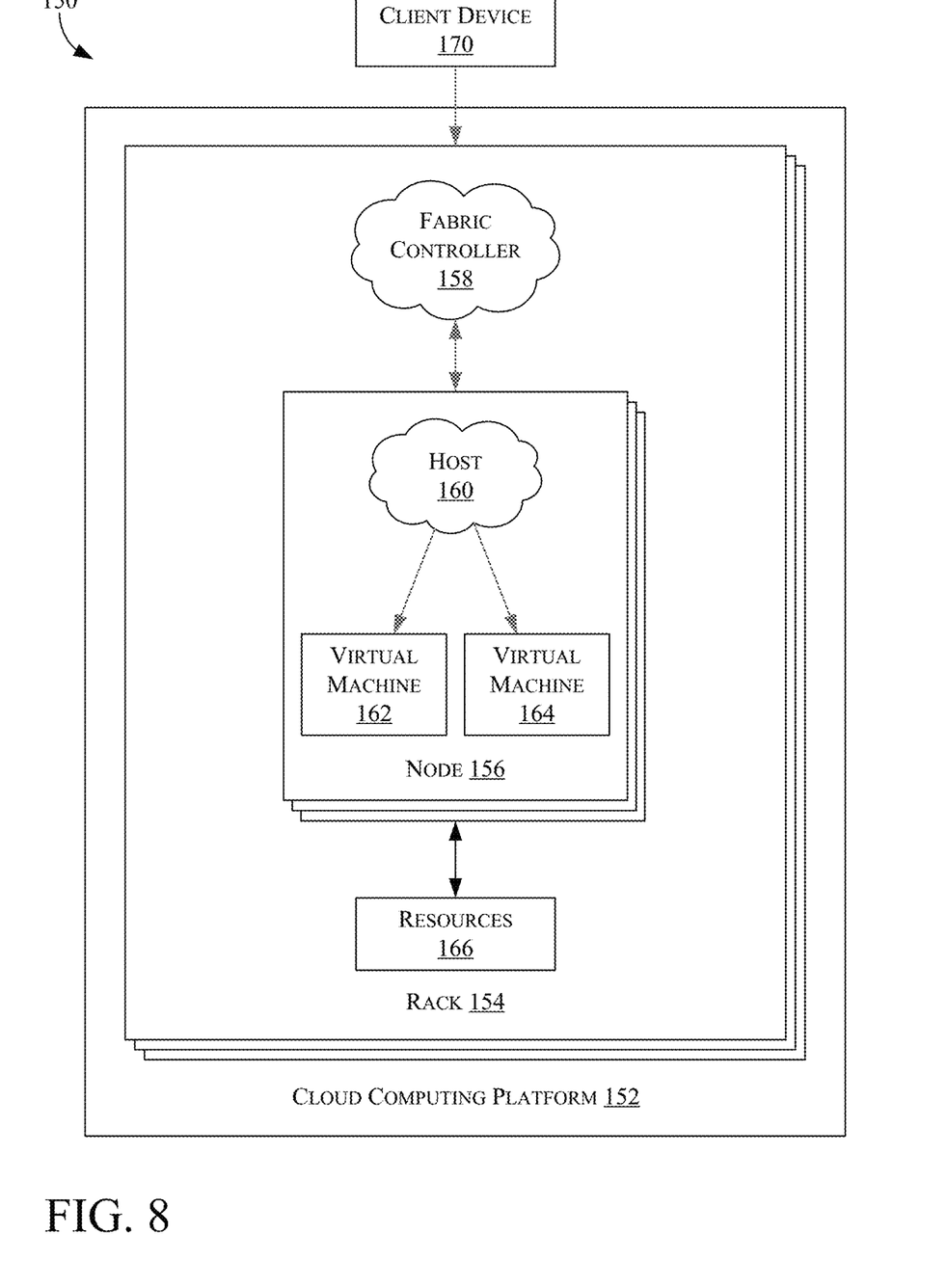
FIG. 8 is a diagram depicting a distributed computing environment implementation.

Referring now to FIG. 8, an example of a distributed computing environment 150 is shown. FIG. 8 shows a high level architecture of a cloud computing platform 152 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The distributed computing environment 150 includes data centers that includes cloud computing platform 152, rack 154, and node 156 (e.g., computing devices, processing units, or blades) in rack 154. The technical solution environment can be implemented with cloud computing platform 152 that runs cloud services across different data centers and geographic regions. Cloud computing platform 152 can implement fabric controller 158 component for provisioning and managing resource allocation, deployment, upgrade, and management of cloud services. Typically, a cloud computing platform 152 acts to store data or data analytics applications in a distributed manner. Cloud computing platform 152 in a data center can be configured to host and support operation of endpoints of a particular service application. Cloud computing platform 152 may be a public cloud, a private cloud, or a dedicated cloud.

Node 156 can be provisioned with host 160 (e.g., operating system or runtime environment) execution a defined software stack on node 156. Node 156 can also be configured to perform specialized functionality (e.g., compute nodes or storage nodes) within cloud computing platform 152. Node 156 is allocated to run one or more portions of a service application of a tenant. A tenant can refer to a retailer utilizing resources of cloud computing platform 152. Service application components of cloud computing platform 152 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 156, nodes 156 may be partitioned into virtual machines (e.g., virtual machine 162 and virtual machine 164). Physical machines can also concurrently run separate service applications. The virtual machines or physical machines can be configured as individualized computing environments that are supported by resources 166 (e.g., hardware resources and software resources) in cloud computing platform 152. It is contemplated that resources can be configured for specific service applications. Further, each service application may be divided into functional portions such that each functional portion is able to run on a separate virtual machine. In cloud computing platform 152, multiple servers may be used to run data analytics applications and perform data storage operations in a cluster. In particular, the servers may perform data operations independently but exposed as a single device referred to as a cluster. Each server in the cluster can be implemented as a node.

Client device 170 may be linked to a service application in cloud computing platform 152. Client device 170 may be any type of computing device, which may correspond to computing device 180 described with reference to FIG. 9, for example, client device 170 can be configured to issue commands to cloud computing platform 152. In embodiments, client device 170 may communicate with data analytics applications through a virtual Internet Protocol (IP) and load balancer or other means that direct communication requests to designated endpoints in cloud computing platform 152. The components of cloud computing platform 152 may communicate with each other over a network (not shown), which may include, without limitation, one or more local area networks (LANs) and/or wide area networks (WANs).

Example Computing Environment

Figure 9:
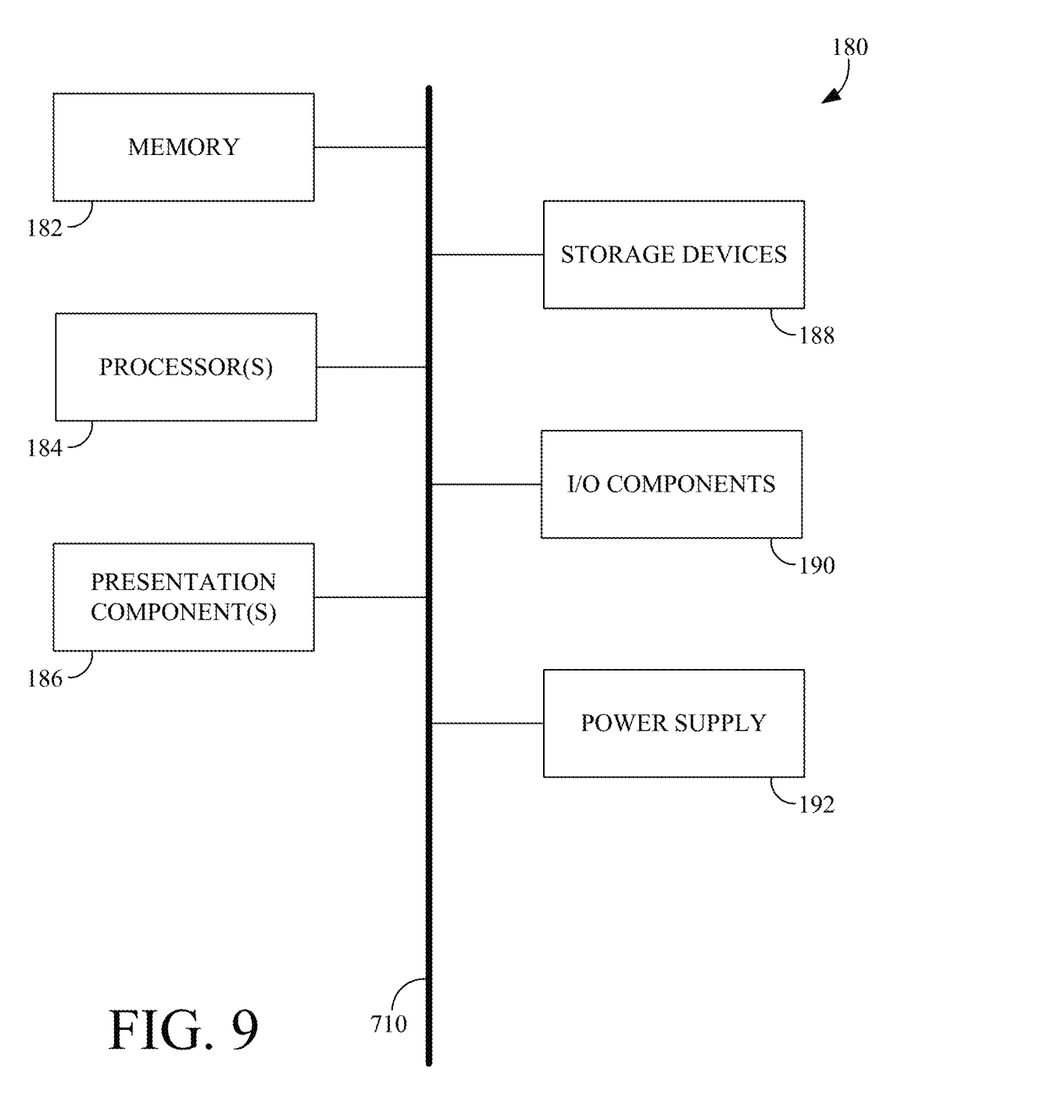
FIG. 9 is a diagram depicting a computer system.

Referring to FIG. 9, an example operating environment for implementing embodiments of the present invention is shown and designated generally as computing device 180. Essential elements of a computing device 180 or a computer or a computer system or a data processing system are one or more programmable processors 184 for performing actions in accordance with instructions and one or more memory devices 182 for storing instructions and data. Generally, a computer will also include, or be operatively coupled, (via bus, fabric, network, etc.) to I/O components 190, e.g., display devices, network/communication subsystems, etc. and one or more mass storage devices 188 for storing data and instructions, etc., which are powered by a power supply 192.

Embodiments can be implemented in digital electronic circuitry, or in computer hardware, firmware, software, or in combinations thereof. Embodiments can be implemented in a computer program product tangibly stored in a machine-readable (e.g., non-transitory computer readable) hardware storage device for execution by a programmable processor; and method actions can be performed by a programmable processor executing a program of executable computer code (executable computer instructions) to perform functions of the invention by operating on input data and generating output. Embodiments can be implemented advantageously in one or more computer programs executable on a programmable system, such as a data processing system that includes at least one programmable processor coupled to receive data and executable computer code from, and to transmit data and executable computer code to, memory, and a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive executable computer code (executable computer instructions) and data from memory, e.g., a read-only memory and/or a random access memory and/or other hardware storage devices. Generally, a computer will include one or more mass storage devices for storing data files; such devices include magnetic disks, such as internal hard disks and removable disks;

magneto-optical disks; and optical disks. Hardware storage devices suitable for tangibly storing computer program executable computer code and data include all forms of volatile memory, e.g., semiconductor random access memory (RAM), all forms of non-volatile memory including, by way of example, semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

A number of embodiments of the invention have been described. The embodiments can be put to various uses, such as educational, job performance enhancement, e.g., sales force and so forth. Nevertheless, it will be understood that various modifications may be made without departing from the scope of the invention.

What is claimed is:

1. A computer system comprises:
   an orchestration engine that allows for optimizing of investment allocation across plural levers, the orchestration engine configured to:
   generate an executable computer program configured to:
   receive input data that includes historic data regarding pricing and sales according to plural levers;
   prepare the received input data by converting the plural levers in the received input data into a common currency;
   calculate historical return on investment based on the common currency;
   simulate return on investment using the calculated historical return on investment and a machine learning model of a given campaign based on historical sales, campaign definitions, and investment metrics;
   optimize the simulated return on investment from the campaign with respect to one or more optimization goals and constraints; and
   output from the optimizer an optimized, campaign plan; and
   execute the executable computer program to:
   receive input data that includes historic data regarding pricing and sales according to plural levers;

prepare the received input data by converting the plural levers in the received input data into a common currency;

calculate historical return on investment based on the common currency;

simulate return on investment using the calculated historical return on investment and the machine learning model of the given campaign based on historical sales, campaign definitions, and investment metrics;

optimize the simulated return on investment from the campaign with respect to one or more optimization goals and constraints; and output from the optimizer an optimized, campaign plan.

2. The computer system of claim 1 wherein the computer system is further configured to:

optimize the investment allocation across the plural that include at least one selected from the group including pricing, mass promotion, personalized offers, loyalty, and markdowns levers.

3. The computer system of claim 1 wherein the common currency provides a standardized metric for measuring true effects in a comparable way between pricing mass promotion, personalized offers, loyalty, and markdowns levers.

4. The computer system of claim 1 wherein the machine learning model takes into account plural components that impact an actual return on investment for an actual campaign.

5. The computer system of claim 4 wherein a true return on investment is calculated for each actual campaign and each lever.

6. The computer system of claim 1 wherein the orchestration engine is further configured to:

convert the plural levers in the received input data into the common currency according to a like-for-like incremental sales/margin values that are calculated for different ones of the plural levers.

7. The computer system of claim 6 wherein the orchestration engine is further configured to:

determine for each lever of the plural levers used by the retailer the like-for-like incremental sales/margin values.

8. The computer system of claim 7 wherein for the orchestration engine is further configured to:

calculate an incremental sales or an incremental margin value for each lever of the plural levers.

9. The computer system of claim 8 wherein the orchestration engine is further configured to:

compare the calculated incremental sales or the incremental margin value for each lever of the plural levers to determine which lever of the plural levers has a highest incremental sale and/or incremental margin value.

10. One or more machine-readable hardware storage devices for orchestration engine that allows for optimizing of investment allocation across plural levers, the one-more machine-readable hardware storage devices storing instructions that are executable by one or more processors to cause the orchestration engine to:

generate an executable computer program configured to:
receive input data that includes historic data regarding pricing and sales according to plural levers;
prepare the received input data by converting the plural levers in the received input data into a common currency;
calculate historical return on investment based on the common currency;
simulate return on investment using the calculated historical return on investment and a machine learning model of a given campaign based on historical sales, campaign definitions, and investment metrics;
optimize the simulated return on investment from the campaign with respect to one or more optimization goals and constraints; and
output from the optimizer an optimized, campaign plan; and execute the executable computer program to:
receive input data that includes historic data regarding pricing and sales according to plural levers;
prepare the received input data by converting the plural levers in the received input data into a common currency;
calculate historical return on investment based on the common currency;
simulate return on investment using the calculated historical return on investment and the machine learning model of the given campaign based on historical sales, campaign definitions, and investment metrics;
optimize the simulated return on investment from the campaign with respect to one or more optimization goals and constraints; and
output from the optimizer an optimized, campaign plan.

11. The one or more machine-readable hardware storage devices of claim 10, wherein the orchestration engine is further configured to:

optimize the investment allocation across the plural levers that include at least one selected from the group including pricing, mass promotion, personalized offers, loyalty, and markdowns levers.

12. The one or more machine-readable hardware storage devices of claim 10, wherein the common currency provides a standardized metric for measuring true effects in a comparable way between pricing mass promotion, personalized offers, loyalty, and markdowns levers.

13. The one or more machine-readable hardware storage devices of claim 10, wherein the machine learning model takes into account plural components that impact an actual return on investment for an actual campaign.

14. The one or more machine-readable hardware storage devices of claim 13, wherein a true return on investment is calculated for each actual campaign and each lever.

15. The one or more machine-readable hardware storage devices of claim 10, wherein the orchestration engine is further configured to:

convert the plural levers in the received input data into the common currency according to a like-for-like incremental sales/margin values that are calculated for different ones of the plural levers.

16. The one or more machine-readable hardware storage devices of claim 15, wherein the orchestration engine is further configured to:

determine for each lever of the plural levers used by the retailer the like-for-like incremental sales/margin values.

17. The one or more machine-readable hardware storage devices of claim 16, wherein for the orchestration engine is further configured to:

calculate an incremental sales or an incremental margin value for each lever of the plural levers.

18. The one or more machine-readable hardware storage devices of claim 17, wherein the orchestration engine is further configured to:

compare the calculated incremental sales or the incremental margin value for each lever of the plural levers to determine which lever of the plural levers has a highest incremental sales and/or incremental margin value.

19. A method implemented by an orchestration engine of a data processing system that allows for optimizing of investment allocation across plural levers, the method including:
generating an executable computer program configured to perform operations including:
receiving input data that includes historic data regarding pricing and sales according to plural levers;
preparing the received input data by converting the plural levers in the received input data into a common currency;
calculating historical return on investment based on the common currency;
simulating return on investment using the calculated historical return on investment and a machine learning model of a given campaign based on historical sales, campaign definitions, and investment metrics;
optimizing the simulated return on investment from the campaign with respect to one or more optimization goals and constraints; and
outputting from the optimizer an optimized, campaign plan; and
executing the executable computer program to:
receive input data that includes historic data regarding pricing and sales according to plural levers;
prepare the received input data by converting the plural levers in the received input data into a common currency;
calculate historical return on investment based on the common currency;
simulate return on investment using the calculated historical return on investment and the machine learning model of the given campaign based on historical sales, campaign definitions, and investment metrics;
optimize the simulated return on investment from the campaign with respect to one or more optimization goals and constraints; and
output from the optimizer an optimized, campaign plan.

20. The method of claim 19, wherein the common currency provides a standardized metric for measuring true effects in a comparable way between pricing mass promotion, personalized offers, loyalty, and markdowns levers.

* * * * *